United States Patent
Church et al.

(10) Patent No.: US 6,703,584 B2
(45) Date of Patent: Mar. 9, 2004

(54) DISC CLAMP ADJUSTMENT USING HEAT

(75) Inventors: Robert B. Church, Boulder, CO (US); Gary E. Bement, Frederick, CO (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 10/228,554

(22) Filed: Aug. 26, 2002

(65) Prior Publication Data

US 2003/0209529 A1 Nov. 13, 2003

Related U.S. Application Data

(60) Provisional application No. 60/380,527, filed on May 13, 2002.

(51) Int. Cl.[7] ............................................. G11B 17/035
(52) U.S. Cl. ................................................. 219/121.85
(58) Field of Search ..................... 219/121.85, 121.83, 219/121.73; 369/44.13, 44.14; 360/98.08, 99.12

(56) References Cited

U.S. PATENT DOCUMENTS

| | | | |
|---|---|---|---|
| 4,918,545 A | 4/1990 | Scheffel | 360/98.08 |
| 5,043,965 A * | 8/1991 | Iida et al. | 369/44.13 |
| 5,274,517 A | 12/1993 | Chen | 360/98.08 |
| 5,333,080 A | 7/1994 | Ridinger et al. | 360/99.12 |
| 5,486,962 A | 1/1996 | Boutaghou | 360/99.12 |
| 5,490,024 A | 2/1996 | Briggs et al. | 360/99.12 |
| 5,528,434 A | 6/1996 | Bronshvatch et al. | 360/98.08 |
| 5,550,694 A * | 8/1996 | Hyde | 360/265.6 |
| 5,590,004 A | 12/1996 | Boutaghou | 360/99.12 |
| 5,592,349 A | 1/1997 | Morehouse et al. | 360/98.08 |
| 5,663,851 A | 9/1997 | Jeong et al. | 360/98.08 |
| 5,694,269 A | 12/1997 | Lee | 360/98.08 |
| 5,732,458 A | 3/1998 | Moir et al. | 329/603.03 |
| 5,761,002 A | 6/1998 | Moir et al. | 360/98.08 |
| 5,768,052 A | 6/1998 | Smith | 360/99.12 |
| 5,790,345 A | 8/1998 | Alt | 360/98.08 |
| 5,877,571 A | 3/1999 | Brooks | 360/99.12 |
| 5,912,784 A | 6/1999 | Bronshvatch et al. | 360/98.08 |
| 6,226,146 B1 | 5/2001 | Landess et al. | 360/98.08 |
| 6,304,412 B1 | 10/2001 | Voights | 360/98.08 |

* cited by examiner

Primary Examiner—M. Alexandra Elve
Assistant Examiner—Jonathan Johnson
(74) Attorney, Agent, or Firm—Merchant & Gould P.C.

(57) ABSTRACT

A method of adjusting a distribution of clamping pressure applied to a disc by a disc clamp includes identifying an uneven distribution of clamping pressure applied to the disc by the disc clamp. A quantity of heat is determined and applied to the disc clamp to remedy the uneven distribution of clamping pressure. A system for adjusting a clamping pressure applied to a data storage disc by a disc clamp includes a disc pack assembly having a disc clamp securing a disc to a spindle motor hub. The system also includes means for identifying an uneven distribution of clamping pressure applied to the disc by the disc clamp and for remedying the uneven distribution of clamping pressure by heating the disc clamp for a period of time.

22 Claims, 4 Drawing Sheets

DISC CLAMP ADJUSTMENT USING HEAT

RELATED APPLICATIONS

This application claims priority of United States provisional application Serial No. 60/380,527, filed May 13, 2002.

FIELD OF THE INVENTION

This application relates generally to disc drives and more particularly to a method and system for using heat to adjust a disc clamp of a disc drive.

BACKGROUND OF THE INVENTION

A disc drive typically includes one or more discs that are rotated at a constant high speed by a spindle motor during operation of the drive. Information is written to and read from tracks on the discs through the use of an actuator assembly, which rotates during a seek operation. A typical actuator assembly includes a plurality of actuator arms, which extend towards the discs, with one or more flexures extending from each of the actuator arms. Mounted at the distal end of each of the flexures is a head, which acts as an air bearing slider enabling the head to fly in close proximity above the corresponding surface of the associated disc.

Increasing the density of information stored on discs can increase the storage capacity of hard disc drives. To read the densely stored information, designers have decreased the gap fly height between the heads and the discs. Reducing the gap fly height can lead to increased contact between the head and the data portion of the disc during operation of the disc drive (i.e., head-disc interference). Such interference can excite head and disc resonance frequencies, which can interfere with the servo positioning of the recording heads over the data tracks. For example, if head-disc interference occurs during a servo track writing operation, then spurious vibrations may be written into the servo pattern due to the excitation of head and disc resonance modes. Head-disc interference can also lead to accelerated head and disc surface wear. This may culminate in a "head crash," a phenomena where the recording head irreparably damages the disc surface, resulting in loss of data and catastrophic disc drive failure.

Head-disc interference is particularly likely if the disc surfaces are not sufficiently flat. Even if discs are flat before being mounted on the spindle motor, the disc clamp that secures the discs to the spindle motor may deform the discs by applying uneven pressure to the discs.

Accordingly there is a need for a disc clamp that more evenly distributes clamping pressure applied to the discs. The present invention provides a solution to this and other problems, and offers other advantages over the prior art.

SUMMARY OF THE INVENTION

Against this backdrop the present invention has been developed. An embodiment of the present invention is a method of adjusting a distribution of clamping pressure applied to a disc by a disc clamp. The method includes identifying the uneven distribution of clamping. A quantity of heat is determined and applied to the disc clamp so that the quantity of heat will remedy the uneven distribution of clamping pressure.

An alternative embodiment of the present invention is a method of adjusting a distribution of clamping pressure applied to a data storage disc by a disc clamp. This method includes analyzing a contour of a data surface of the disc and identifying from the contour an uneven distribution of clamping pressure applied to the disc by the disc clamp. A quantity of heat to be applied to the disc clamp to remedy the uneven distribution of clamping pressure is determined and applied to the disc clamp. Yet another embodiment of the present invention is a system for adjusting a clamping pressure applied to a data storage disc by a disc clamp. The system includes a disc pack assembly having a disc clamp securing a disc to a spindle motor hub. The system also includes means for identifying an uneven distribution of clamping pressure applied to the disc by the disc clamp and for remedying the uneven distribution of clamping pressure by heating the disc clamp for a period of time.

These and various other features as well as advantages which characterize the present invention will be apparent from a reading of the following detailed description and a review of the associated drawings.

DETAILED DESCRIPTION

Figure 1:
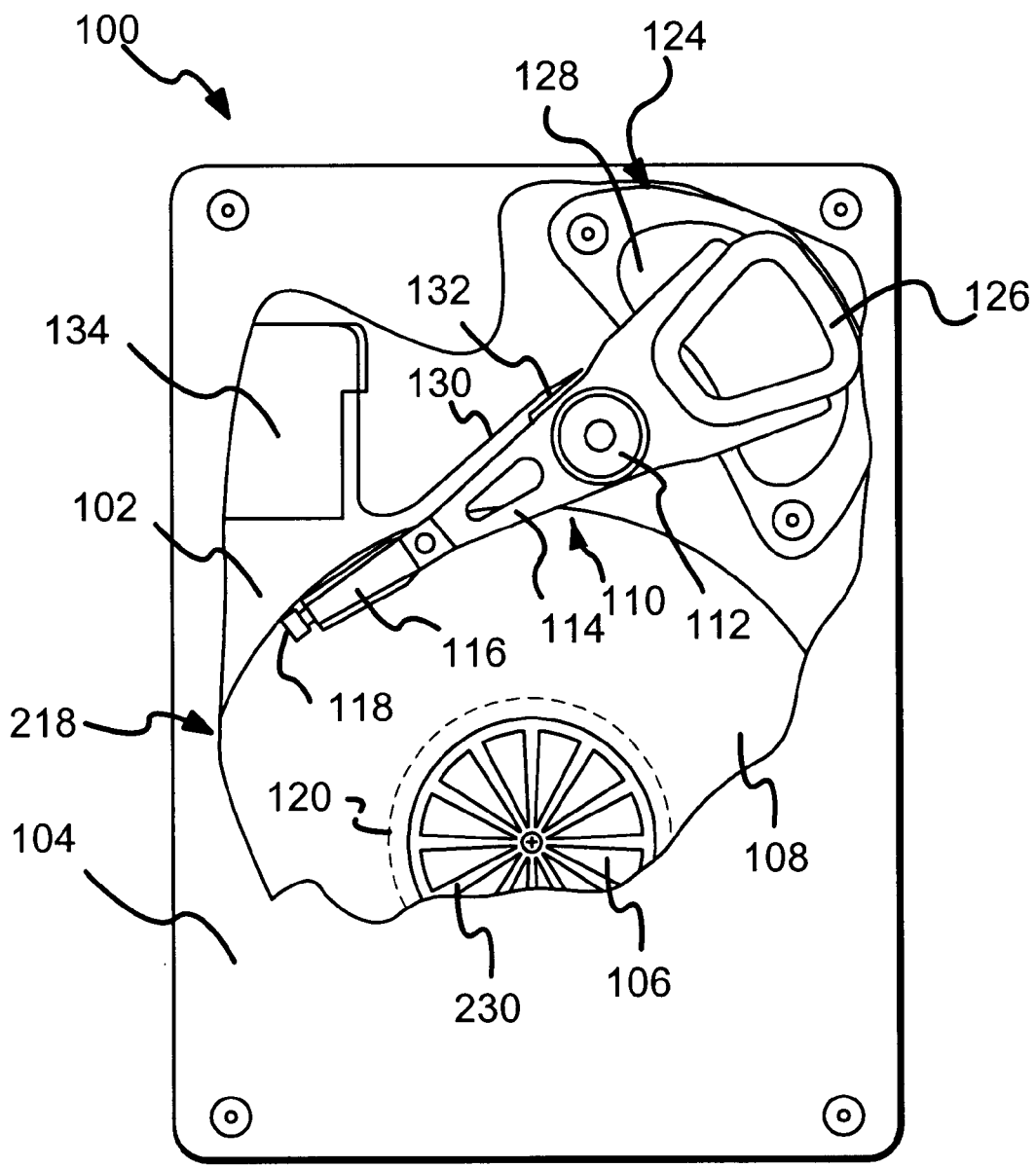
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106., which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118, which includes an air bearing slider enabling the head 118 to fly in close proximity above the corresponding surface of the associated disc 108.

During a seek operation, the track position of the heads 118 is controlled through the use of a voice coil motor 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are typically moved over park zones 120 near the inner diameter of the discs 108 or on ramps near the inner or outer diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 3:
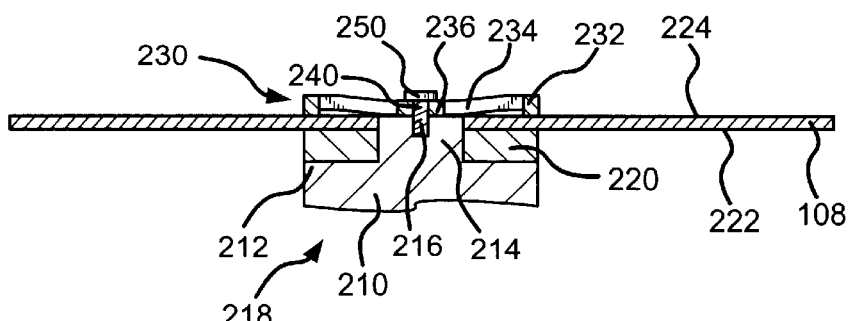
FIG. 3 is a sectional view taken along line 3—3 of FIG. 2.
Figure 2:
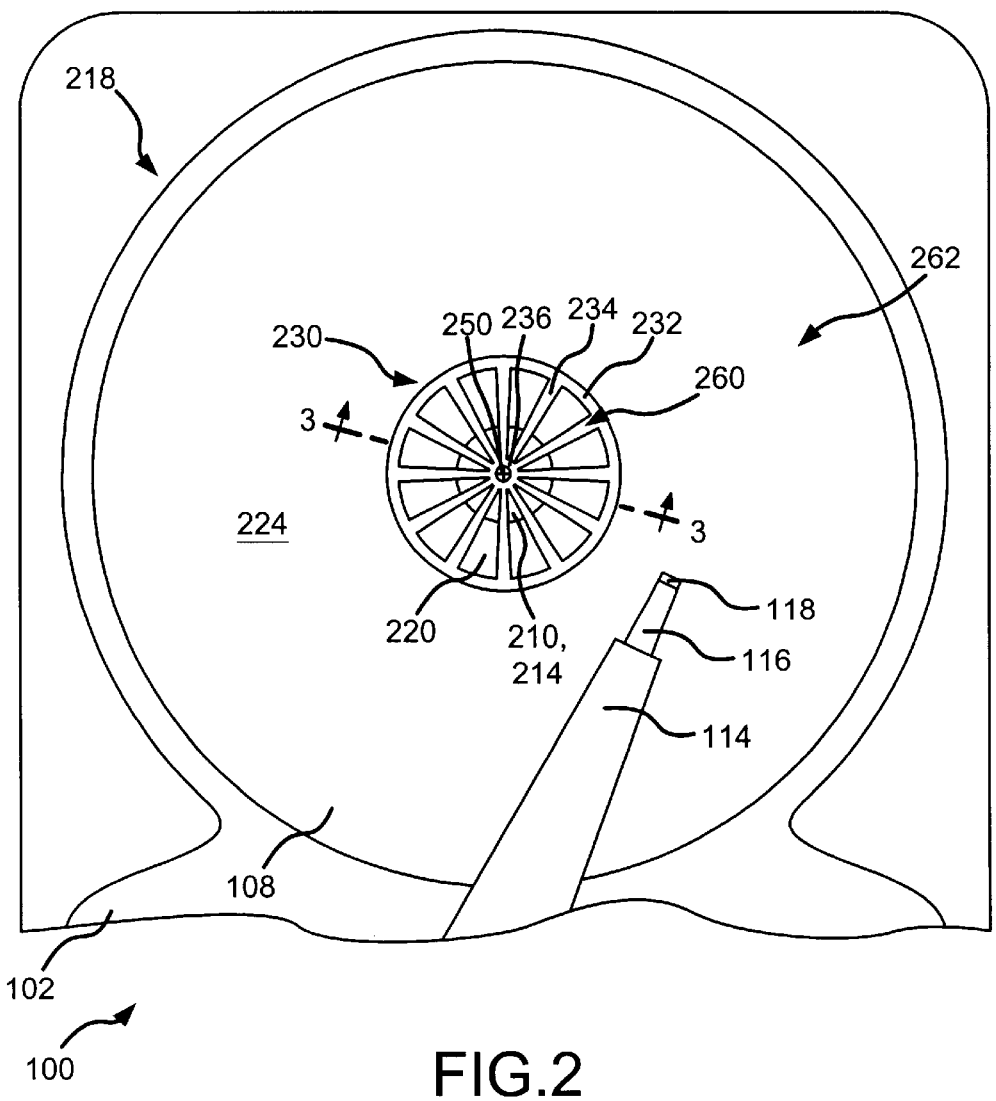
FIG. 2 is a cut-away plan view of a disc drive without a cover according to a preferred embodiment of the present invention.
Figure 4:
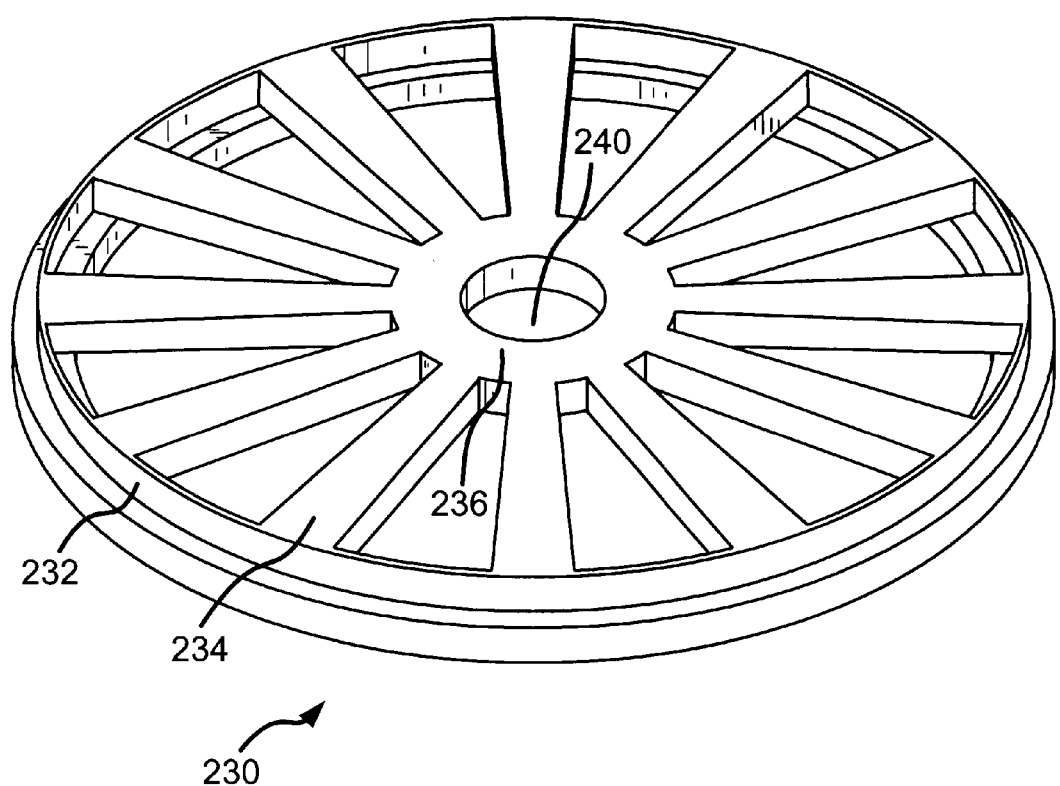
FIG. 4 is a separate perspective view of the disc clamp of FIG. 2 according to a preferred embodiment of the present invention.

Referring to FIGS. 2–4, the spindle motor 106 has stationary stator coils (not shown) and carries a generally cylindrical hub 210, rotatably mounted on a stationary spindle (not shown). The hub 210 shown in FIG. 3 has a cylindrical bottom flange 212 and a cylindrical head 214 extending upward from the flange 212. The head 214 defines a centrally located fastener hole 216. The flange 212, head 214, and fastener hole 216 are all preferably substantially concentric. Notably, however, the hub can have many different configurations in accordance with the present invention. For example, the hub can include several circumferentially spaced fastener holes, rather than a single centrally located faster hole 216. A disc pack assembly 218 includes the hub 210 and the discs 108.

The disc pack assembly 218 also includes an annular spacer 220 that is seated on the hub 210 so that it extends around the head 214 and rests on the flange 212. The present invention can be used without the spacer 220. Also, in an embodiment wherein the disc drive 100 includes multiple discs 108, spacers 220 preferably separate each of the discs 108. The disc 108 is in turn seated on the hub 210 so that it extends about the head 214 and rests on the spacer 220. The disc 108 has a lower data surface 222 and an upper surface 224 with a portion of each having data stored thereon.

Additionally, the disc pack assembly 218 includes a disc clamp 230 (seen separately in FIG. 4), which is centrally located on the upper surface 224. A rim 232 forms the periphery of the disc clamp 230, and circumferentially spaced spokes 234 extend radially inward from the rim 232 to a hub 236. The hub 236 is preferably concentric with the rim 232, and it preferably defines a centrally located fastener hole 240. Alternatively, the hub 236 could define multiple circumferentially spaced fastener holes. The disc clamp 230 is preferably made of stainless steel, although it could be made of some other type of material.

A fastener 250 extends through the fastener hole 240 in the disc clamp 230 and into the fastener hole 216 in the hub 210. The fastener 250 preferably engages the hub 210 and draws the hub 236 downwardly beyond its normal resting position, thereby creating stresses in the spokes 234 so that the spokes 234 apply a constant downward pressure on the rim 232. The rim 232 in turn applies a downward pressure on the upper surface 224 of the disc 108 to hold the disc 108 securely in place on the hub 210.

The disc clamp 230 may not evenly distribute pressure to the upper surface 224 of the disc 108. For example, a region 260 of the disc clamp 230, including one or more spokes 234, may apply pressure that deforms an adjacent region 262 of the disc 108 in a downward direction more than in other areas around the disc 108. An uneven pressure distribution could also result from other sources, such as a disc 108 that is not flat before being mounted on the spindle motor 106 or a defect in the flange 212. The defects in the contour of the disc 108 resulting from such uneven pressure distribution include circumferential curvature, radial slope, and radial curvature or combinations of circumferential curvature, radial slope, and radial curvature.

In accordance with an embodiment of the present invention, stress in the region 260 is relieved while the disc 108 and the disc clamp 230 remain in the disc drive 100 so that the localized pressure applied by the region 260 of the disc clamp 230 is decreased and the deformation of the adjacent region 262 of the disc 108 is remedied. This localized adjustment of the disc clamp 230 can be repeated for the region 260 and/or for other regions of the disc clamp 230 that are applying uneven pressure to the disc 108.

Figure 5:
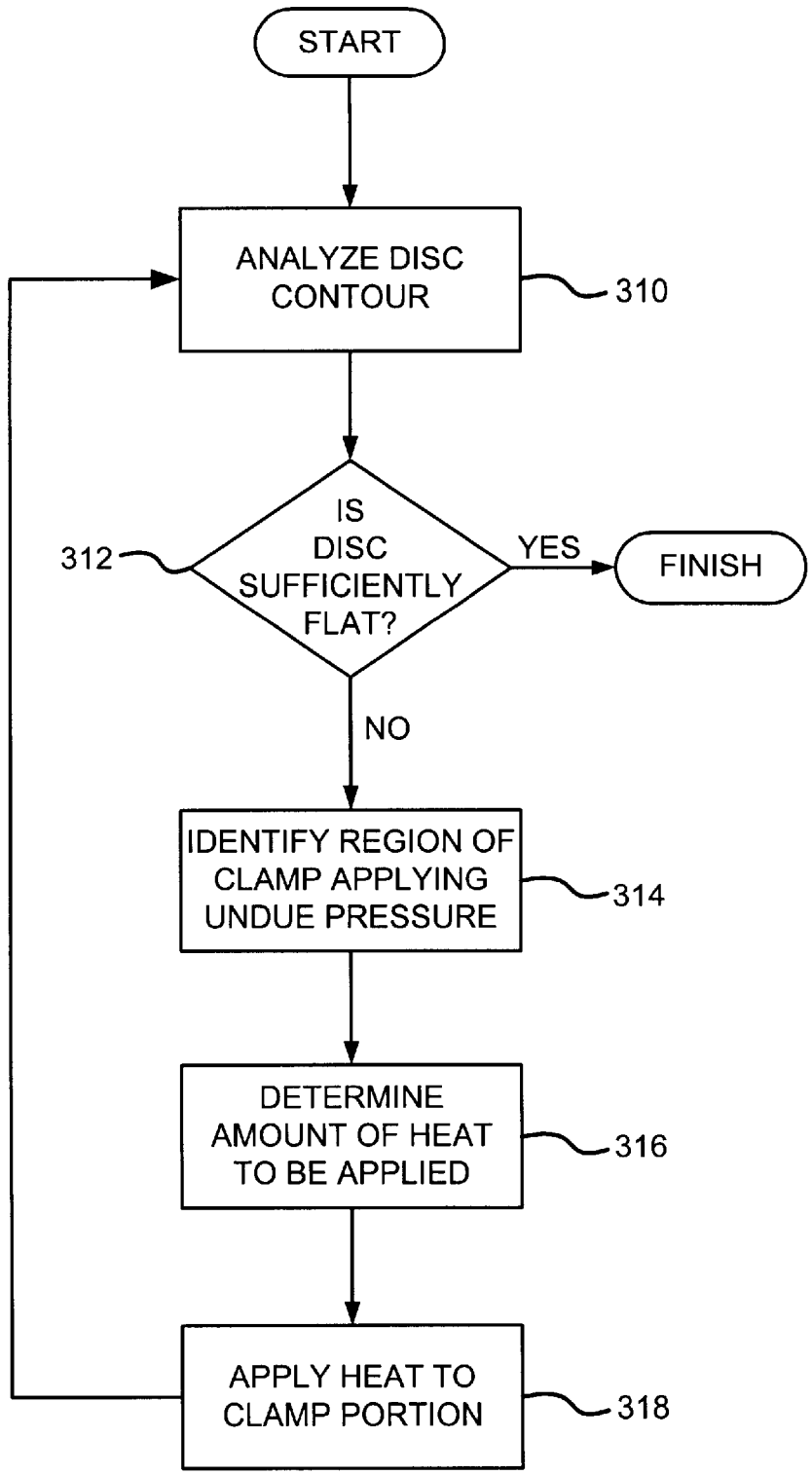
FIG. 5 is a flow chart depicting a process flow for adjusting a disc clamp according to the present invention.

Referring to FIG. 5, once the disc 108 is securely mounted on the hub 210, in contour analysis operation 310, the upper surface 224 of the disc 108 is analyzed. In a preferred embodiment, this analysis includes analyzing substantially the entire upper surface 224 using a standard optical interferometer. Alternatively, the surface may be characterized in some other way, such as by using a laser Doppler vibrometer.

Flatness query operation 312 determines whether the disc 108 is sufficiently flat based on the contour analysis of he upper surface 224 performed in contour analysis operation 310. If the disc 108 is sufficiently flat, then the operation flow terminates and the disc drive 100 is approved. If the disc 108 is not sufficiently flat, then a region identification operation 314 identifies a region 260 of the disc clamp 230 that is applying too much pressure to the disc 108. The region 260 may include one or more spokes 234. However, the present invention can be used with disc clamps that have no spokes, such as disc clamps that are solid discs. The region 260 is preferably identified by viewing the results of the contour analysis and determining which regions 262 of the disc 108 are deformed. Such a deformed region 262 indicates the adjacent disc clamp region 260 is applying uneven pressure.

In heat determination operation 316, the amount of heat to be applied to the disc clamp region 260 is determined. This determination preferably includes determining both the intensity of heat to be applied to the disc clamp region 260 and the time to apply the heat. This may be done by characterizing a type of disc clamp that is similar to the disc clamp 230. Such characterization may include modeling the type of disc clamp, but preferably includes heating a plurality of disc clamps similar to the disc clamp 230 and characterizing the effects of different heat intensities and times on those disc clamps. Specifically, this characterization preferably includes determining the amount of stress relief that is produced by selected heat time and heat intensity combinations. Such characterizations can then be used along with the contour analysis of the specific disc 108 and disc clamp 230 to determine the heat intensity and time for the particular disc clamp 230. Preferably, the time and heat intensity are chosen so that the disc clamp region 260 is heated above ambient temperature, but not to the melting point of the disc clamp 230. More preferably, the time and heat intensity are chosen so that stresses in the disc clamp region 260 are sufficiently relieved so that the disc clamp 230 applies substantially even pressure to the disc 108.

In heat application operation 318, heat is applied to the region; 260 of the disc clamp 230. In a preferred embodiment, this includes directing a laser beam at the region 260 of the disc clamp 230, which is preferably a spoke 234 of the disc clamp 230. The laser is preferably a high power laser, such as a 300 mW Nd:Vanadate laser. Also, the power of the laser is preferably variable so that different laser powers can be selected to produce different heat intensities. A laser beam at the selected power is directed at the region for the determined period of time. Notably, however, other heat sources, such as ultrasonic heat sources, can be used. The increased temperatures in the disc clamp region 260 relieve the stresses in the region 260, thereby decreasing the pressure applied to the disc 108 by that region 260 of the disc clamp 230, which in turn decreases or eliminates the deformation in the region 262 of the disc 108 caused by the pressure of the disc clamp region 260.

Heat application operation 318 is preferably performed in a substantially oxygen-free environment, such as in a nitrogen environment. Such an environment minimizes the effects of oxidation on the disc clamp 230 and on the heating process. Directing a stream of nitrogen at the disc clamp 230 while heating the disc clamp 230, even if the nitrogen environment is not fully enclosed, can create a sufficient nitrogen environment.

The process flow preferably returns to the contour analysis operation 310 and then to the flatness query operation 312. If the disc 108 is sufficiently flat, then the process flow terminates and the disc drive 100 is approved. If the disc 108 is not sufficiently flat, then the process flow continues to the region identification operation 314 as discussed above. Thus, the process flow preferably continues until the disc 108 is sufficiently flat or until it is determined that sufficient flatness cannot be obtained.

The disc clamp adjustment described above may be performed on every disc drive 100 that is produced, or it may be performed only on disc drives 100 that have been rejected by existing quality control procedures because the disc 108 in the disc drive 100 is not sufficiently flat. Thus, the adjustment according to the present invention may be used to improve the overall flatness of disc drives 100 being produced, to reduce scrap in the production of disc drives 100, or both.

In summary, an embodiment of the present invention may be described as a method of adjusting a distribution of clamping pressure applied to a disc (such as 108) by a disc clamp (such as 260). The method includes identifying the uneven distribution of clamping pressure. A quantity of heat is determined and applied to the disc clamp so that the: quantity of heat will remedy the uneven distribution of clamping pressure.

Identifying the uneven distribution of clamping pressure may include identifying a region (such as 260) of the disc clamp that is applying an uneven clamping pressure to a region (such as 262) of the disc. The quantity of heat may be applied to the region of the disc clamp. The uneven distribution of clamping pressure may be identified by analyzing a contour of a data surface (such as 224) of the disc with an interferometer. The quantity of heat applied preferably heats at least a portion of the disc clamp to a temperature above ambient temperature and below a melting point of the disc clamp. In a preferred embodiment, the heat is applied by directing a laser beam at the disc clamp.

Determining the quantity of heat may include heating a plurality of disc clamps that are similar to the disc clamp, analyzing the effects of heat on the plurality of disc clamps to produce a characterization of the plurality of disc clamps, and determining from the characterization a period of time to heat the disc clamp. A heat intensity to be applied for the period of time is preferably also determined. The heat application is preferably performed in a substantially oxygen-free environment.

The disc clamp preferably includes a hub (such as 236), a concentric rim (such as 232), and spokes (such as 234) extending between the hub and the rim.

An embodiment of the present invention may be alternatively described as a method of adjusting a distribution of clamping pressure applied to a data storage disc (such as 108) by a disc clamp (such as 230). This method includes analyzing a contour of a data surface (such as 224) of the disc and identifying from the contour an uneven distribution of clamping pressure applied to the disc by the disc clamp. A quantity of heat to be applied to the disc clamp to remedy the uneven distribution of clamping pressure is determined and applied to the disc clamp.

An embodiment of the present invention may be alternatively described as a system for adjusting a clamping pressure applied to a data storage disc (such as 108) by a disc clamp (such as 230). The system includes a disc pack assembly having a disc clamp (such as 230) securing a disc (such as 108) to a spindle motor hub (such as 210). The system also includes means for identifying an uneven distribution of clamping pressure applied to the disc by the disc clamp and for remedying the uneven distribution of clamping pressure by heating the disc clamp for a period of time.

It will be clear that the present invention is well adapted to attain the ends and advantages mentioned as well as those inherent therein. While presently preferred embodiments have been described for purposes of this disclosure, various changes and modifications may be made which are well within the scope of the present invention. For example, the process may include identifying and adjusting several disc clamp regions that are applying too much pressure. Numerous other changes may be made which will readily suggest themselves to those skilled in the art and which are encompassed in the scope of the invention disclosed and as defined in the appended claims.

What is claimed is:

1. In a disc pack assembly having a disc clamp securing a data storage disc to a spindle motor hub, a method of adjusting a distribution of clamping pressure applied to the disc by the disc clamp, the method comprising steps of:

(a) identifying an uneven distribution of clamping pressure applied to the disc by the disc clamp;

(b) determining a quantity of heat to be applied to the disc clamp to remedy the uneven distribution of clamping pressure; and (c) applying the quantity of heat to the disc clamp to remedy the uneven distribution of clamping pressure.

2. The method of claim 1, wherein the identifying step (b) comprises identifying a region of the disc clamp that is applying an uneven clamping pressure to a region of the disc, and wherein the applying step (c) comprises applying the quantity of heat to the region of the disc clamp.

3. The method of claim 2, wherein the identifying step (a) comprises analyzing a data surface of the disc with an interferometer.

4. The method of claim 2, wherein the identifying step (a) comprises analyzing a contour of a data surface of the disc.

5. The method of claim 1, wherein the applying step (c) comprises heating at least a portion of the disc clamp to a temperature above ambient temperature and below a melting point of the disc clamp.

6. The method of claim 1, wherein the applying step (c) comprises directing a laser beam at the disc clamp.

7. The method of claim 1, wherein the determining step (b) comprises steps of:
  (b)(i) heating a plurality of disc clamps that are similar to the disc clamp;
  (b)(ii) analyzing the effects of heat on the plurality of disc clamps to produce a characterization of the plurality of disc clamps; and
  (b)(iii) determining from the characterization a period of time to heat the disc clamp.

8. The method of claim 7, wherein the determining step (b)(iii) further comprises determining a heat intensity with which to apply a heat source and the heating step (c) comprises applying the heat intensity for the determined period of time.

9. The method of claim 1, wherein the applying step (c) is performed in a substantially oxygen-free environment.

10. The method of claim 1, wherein the disc clamp comprises a hub, a concentric rim, and spokes extending between the hub and the rim.

11. In a disc pack assembly having a disc clamp securing a data storage disc to a spindle motor hub, a method of adjusting a distribution of clamping pressure applied to the disc by the disc clamp, the method comprising steps of:
  (a) analyzing a contour of a data surface of the disc;
  (b) identifying from the contour an uneven distribution of clamping pressure applied to the disc by the disc clamp;
  (c) determining a quantity of heat to be applied to the disc clamp to remedy the uneven distribution of clamping pressure applied to the disc by the disc clamp; and
  (d) applying the quantity of heat to the disc clamp to remedy the uneven distribution of clamping pressure applied to the disc by the disc clamp.

12. The method of claim 11, wherein the identifying step (b) comprises identifying from the contour a region of the disc that is deformed, wherein the determining step (c) comprises determining a quantity of heat to be applied to a region of the disc clamp to relieve a clamping pressure applied to the disc by the region of the disc clamp and remedy the deformed region of the disc, and wherein the applying step (c) comprises applying the quantity of heat to the region of the disc clamp.

13. The method of claim 11, wherein the applying step (d) comprises heating at least a portion of the disc clamp to a temperature above ambient temperature and below a melting point of the disc clamp.

14. The method of claim 11, wherein the applying step (d) comprises directing a laser beam at the disc clamp for a period of time.

15. The method of claim 11, wherein the determining step (c) comprises characterizing a type of disc clamp similar to the disc clamp.

16. The method of claim 15, wherein the determining step (c) comprises steps of:
  (i) heating a plurality of disc clamps that are the type of disc clamp;
  (ii) analyzing the effects of heat on the plurality of disc clamps to produce a characterization of the plurality of disc clamps; and
  (iii) determining from the characterization a period of time to heat the disc clamp.

17. The method of claim 11, wherein the applying step (d) is performed in a substantially oxygen-free environment.

18. The method of claim 11, wherein the disc clamp comprises a hub, a concentric rim, and spokes extending between the hub and the rim.

19. A system for adjusting a clamping pressure applied to a data storage disc by a disc clamp, the system comprising:
  a disc pack assembly having a disc clamp securing a disc to a spindle motor hub; and means for identifying an uneven distribution of clamping pressure applied to the disc by the disc clamp and for remedying the uneven distribution of clamping pressure by heating the disc clamp for a period of time.

20. The system of claim 19, wherein the means for identifying and adjusting comprises to means for heating at least a portion of the disc clamp to a temperature above ambient temperature and below a melting point of the disc clamp.

21. The system of claim 19, wherein the means for identifying and adjusting comprises a laser.

22. The system of claim 19, wherein the disc clamp comprises a hub, a concentric rim, and spokes extending between the hub and the rim.

* * * * *

UNITED STATES PATENT AND TRADEMARK OFFICE
CERTIFICATE OF CORRECTION

PATENT NO. : 6,703,584 B2
DATED : March 9, 2004
INVENTOR(S) : Church et al.

It is certified that error appears in the above-identified patent and that said Letters Patent is hereby corrected as shown below:

Column 2,
Line 44, delete the period "." after "106".

Column 5,
Line 53, delete the colon ":" between "the" and "Quantity".

Column 8,
Line 37, delete "to"

Signed and Sealed this

Third Day of August, 2004

JON W. DUDAS
*Acting Director of the United States Patent and Trademark Office*